United States Patent
Tamagawa et al.

(10) Patent No.: US 7,322,331 B2
(45) Date of Patent: Jan. 29, 2008

(54) INTERNAL COMBUSTION ENGINE STARTING CONTROL SYSTEM FOR VEHICLES

(75) Inventors: Yutaka Tamagawa, Utsunomiya (JP); Masanobu Asakawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 11/136,521

(22) Filed: May 25, 2005

(65) Prior Publication Data

US 2005/0263121 A1 Dec. 1, 2005

(30) Foreign Application Priority Data

May 31, 2004 (JP) .............................. 2004-162067

(51) Int. Cl.
*F02N 11/04* (2006.01)
*F02N 11/08* (2006.01)
*F02N 15/00* (2006.01)
*F02N 17/00* (2006.01)

(52) U.S. Cl. .................. 123/179.3; 180/65.2
(58) Field of Classification Search ............ 123/179.3, 123/179.4; 180/65.2
See application file for complete search history.

(56) References Cited

U.S. PATENT DOCUMENTS 6,931,318 B2 * 8/2005 Kaita et al. ................. 701/113

FOREIGN PATENT DOCUMENTS

| JP | 07-119594 | 5/1995 |
| JP | 2003-139028 | 5/2003 |
| JP | 2003-343308 | 12/2003 |

* cited by examiner

*Primary Examiner*—Stephen K. Cronin
*Assistant Examiner*—Arnold Castro
(74) *Attorney, Agent, or Firm*—Arent Fox LLP

(57) ABSTRACT

An internal combustion engine starting control system for a vehicle which has an internal combustion engine as a driving source of the vehicle. The system includes a motor for driving the internal combustion engine; and a control device for performing driving control of the motor by making an actual rotation speed of the motor approach a predetermined target rotation speed. The driving control is a response designation feedback control based on a predetermined state quantity of the vehicle. Typically, the control device changes a response condition in the response designation feedback control in accordance with one of possible starting states of the internal combustion engine, by using a response designation parameter for designating the response condition, by which an approach condition in the operation for making the actual rotation speed of the motor approach the predetermined target rotation speed is changeable.

19 Claims, 10 Drawing Sheets

INTERNAL COMBUSTION ENGINE STARTING CONTROL SYSTEM FOR VEHICLES

Priority is claimed on Japanese Patent Application No. 2004-162067, filed May 31, 2004, the content of which is incorporated herein by reference.

BACKGROUND OF THE INVENTION

1. Field of the Invention

The present invention relates to an internal combustion engine starting control system for vehicles.

2. Description of Related Art

There are known starting control systems and the like, applied to hybrid vehicles which have an internal combustion engine and a motor as driving (force) sources, wherein at least one of the driving forces generated by the internal combustion engine and the motor is transmitted to driving wheels so that the hybrid vehicle moves.

In the first example which is a starting control system, a target rotation speed of the internal combustion engine (i.e., a target engine speed) is corrected in accordance with the degree of increase in the actual engine speed, so as to reduce a period of time necessary for starting the engine and to prevent excessive electric power consumption by the motor (see, for example, Japanese Unexamined Patent Application, First Publication No. 2003-343308).

In the second example which is an internal combustion engine starting system, (i) when a starting operation of the internal combustion engine accomplished by using a starting motor has been completed (i.e., when the rotation speed of the starting motor exceeds a specific threshold), electric power supplied to the starting motor is reduced, or (ii) if an excessive increase in the rotation speed is detected when the starting operation of the internal combustion engine has been completed, electric power is supplied to the starting motor so as to activate the motor (see, for example, Japanese Unexamined Patent Application, First Publication No. H07-119594).

In the third example which is a control system, the internal combustion engine and a starting motor for starting the internal combustion engine are connected via a power transmission device such as a belt, and when the rotation speed of the internal combustion engine (i.e., the engine speed) is lower than a target engine speed, a positive torque is output, and conversely, when the engine speed is higher than the target engine speed, a negative torque is output and the command value for the negative torque has a time constant larger than the time constant of the command value for the positive torque, thereby preventing a sudden change in torque (see, for example, Japanese Unexamined Patent Application, First Publication No. 2003-139028).

However, in the above first and second examples, the electric power supplied to the motor is simply controlled in accordance with the rotation speed of the internal combustion engine or the motor. Therefore, if excessive power is output from a battery (device) provided for communicating electric power with the motor, the battery may be degraded, or other electric equipment devices which receive electric power from the battery may not be suitably operated.

In the above third example, excessive variation in torque is prevented only when the sign of the torque command value is inverted. Therefore, when, for example, the value of the torque is suddenly changed according to the driving state of the vehicle while the sign of the torque command value is maintained (i.e., not inverted), sudden change in torque cannot be prevented.

SUMMARY OF THE INVENTION

In view of the above circumstances, an object of the present invention is to provide an internal combustion engine starting control system for vehicles, for appropriately starting the internal combustion engine while preventing sudden change in torque.

Therefore, the present invention provides an internal combustion engine starting control system for a vehicle which has an internal combustion engine as a driving source of the vehicle, the system comprising:

a motor for driving the internal combustion engine; and a control device (e.g., an MGECU 21 in an embodiment explained later) for performing driving control of the motor by making an actual rotation speed (e.g., a motor rotation speed NM in the embodiment) of the motor approach (or follow) a predetermined target rotation speed (e.g., a target rotation speed NMC in the embodiment), wherein the driving control is a response designation feedback control based on a predetermined state quantity (e.g., an engine water temperature TW, ON/OFF states of a starter switch 37, a start request, or data for the transmission in the embodiment) of the vehicle.

According to the above structure for executing the response designation feedback control based on the predetermined state quantity, the internal combustion engine can be appropriately started in accordance with more various kinds of starting requests and driving states, in comparison with known feedback control simply based on a rotation speed of the internal combustion engine or a motor.

Preferably, the control device changes a response condition in the response designation feedback control in accordance with one of possible starting states of the internal combustion engine, by using a response designation parameter (e.g., a response designation parameter S in the embodiment) for designating the response condition, by which an approach condition in the operation for making the actual rotation speed of the motor approach the predetermined target rotation speed is changeable.

Accordingly, the approach condition, for example, the convergence speed in the operation for making a difference between the actual rotation speed and the target rotation speed bring zero can be changed in accordance with the starting state of the internal combustion engine, thereby performing appropriate starting control while appropriately considering the driver's intention for the starting of the vehicle.

The possible starting states may include at least starting of the internal combustion engine when the vehicle is started, and restarting of the internal combustion engine from an idle stop state of the vehicle. Accordingly, the convergence speed with respect to the rotation speed, determined when the combustion engine is started, has a value different from that determined when the internal combustion engine is restarted. Therefore, it is possible to perform appropriate starting control while appropriately considering the driver's intention for the starting of the vehicle.

It is possible that:

the vehicle includes a motor control unit (e.g., a power drive unit 15 in the embodiment) for controlling an operation state of the motor, and a battery device (e.g., a high-voltage battery 16 in the embodiment) for sending and receiving electrical energy to and from the motor in accordance with control by the motor control unit;

the control device uses a response designation parameter for designating a response condition in the response designation feedback control as a manipulated variable in the feedback control; and the control device determines the response designation parameter by making an actual output (e.g., an output power P in the embodiment) from one of the motor control unit and the battery device approach (or follow) a target output (e.g., a target power PC in the embodiment) which is predetermined in accordance with a predetermined state quantity (e.g., a battery temperature TB, a battery voltage VB, or a battery current IB in the embodiment) of the vehicle, wherein the response designation parameter is determined in a manner such that when the actual output is larger than the target output, speed of response in the response designation feedback control is decreased, and when the actual output is smaller than the target output, the speed of response in the response designation feedback control is increased.

Accordingly, the control device can change the speed of response of the response designation feedback control, for example, the convergence speed in the operation for making a difference between the actual rotation speed and the target rotation speed of the motor bring zero by using the response designation parameter, and the response designation parameter is determined by executing a feed back control for making the actual output from one of the motor control unit and the battery device approach the target output predetermined in accordance with a predetermined state quantity of the vehicle. The feedback control with respect to the actual output from the motor control unit or the battery device is performed in a manner such that when the actual output is larger than the target output, speed of response in the response designation feedback control is decreased, and when the actual output is smaller than the target output, the speed of response in the response designation feedback control is increased. Therefore, in contrast with known feedback control simply based on a rotation speed of the internal combustion engine or a motor, the internal combustion engine can be quickly and appropriately started while optimizing the output of the motor control unit in accordance with various kinds of starting requests and driving states.

It is also possible that:

a driving force from the motor is transmittable to the internal combustion engine via a driving force transmitting device (e.g., a crank shaft pulley 14a, a drive shaft pulley 14b, and a belt 14c in the embodiment); and the control device detects a slip of the driving force transmitting device based on a rotation speed of a rotation shaft of the motor and a rotation speed of a crank shaft of the internal combustion engine, wherein when the slip is detected, speed of response in the response designation feedback control is decreased by using a response designation parameter for designating a response condition in the response designation feedback control.

Typically, the driving force transmitting device includes a belt; and the slip is detected by computing a difference between a rotation speed ratio, which is a ratio between the rotation speed of the rotation shaft of the motor and the rotation speed of the crank shaft of the internal combustion engine, and a predetermined pulley ratio (e.g., a target pulley ratio between the crank shaft pulley 14a and the drive shaft pulley 14b in the embodiment) of the belt.

In this case, having a structure in which the rotation shaft of the motor and the crank shaft of the internal combustion engine are indirectly connected via the driving force transmitting device which may have a belt or a chain, when a slip of the driving force transmitting device is detected, the control device can decrease the speed of response of the response designation feedback control, for example, the convergence speed in the operation for making a difference between the actual rotation speed and the target rotation speed of the motor be zero. Therefore, it is possible to prevent excessive decrease in transmission efficiency of the driving force transmitting device, due to a slip of the belt or chain, or the like, which is caused by a sudden change in torque.

Accordingly, it is possible to prevent difficulty in appropriate start of the internal combustion engine or problems such as damage to the driving force transmitting device.

BRIEF DESCRIPTION OF THE DRAWINGS

FIGS. 8A to 8C are graphs showing comparisons between the response designation control in the embodiment and a comparative feedback control example using a simple PID operation, wherein FIG. 8A shows temporal variations in the engine rotation speed NE, FIG. 8B shows temporal variations in the motor torque $T_M$, and FIG. 8C shows temporal variations in the output power P of the high-voltage battery 16.

DETAILED DESCRIPTION OF THE INVENTION

Hereinafter, embodiments according to the present invention will be explained with reference to the drawings.

Figure 1:
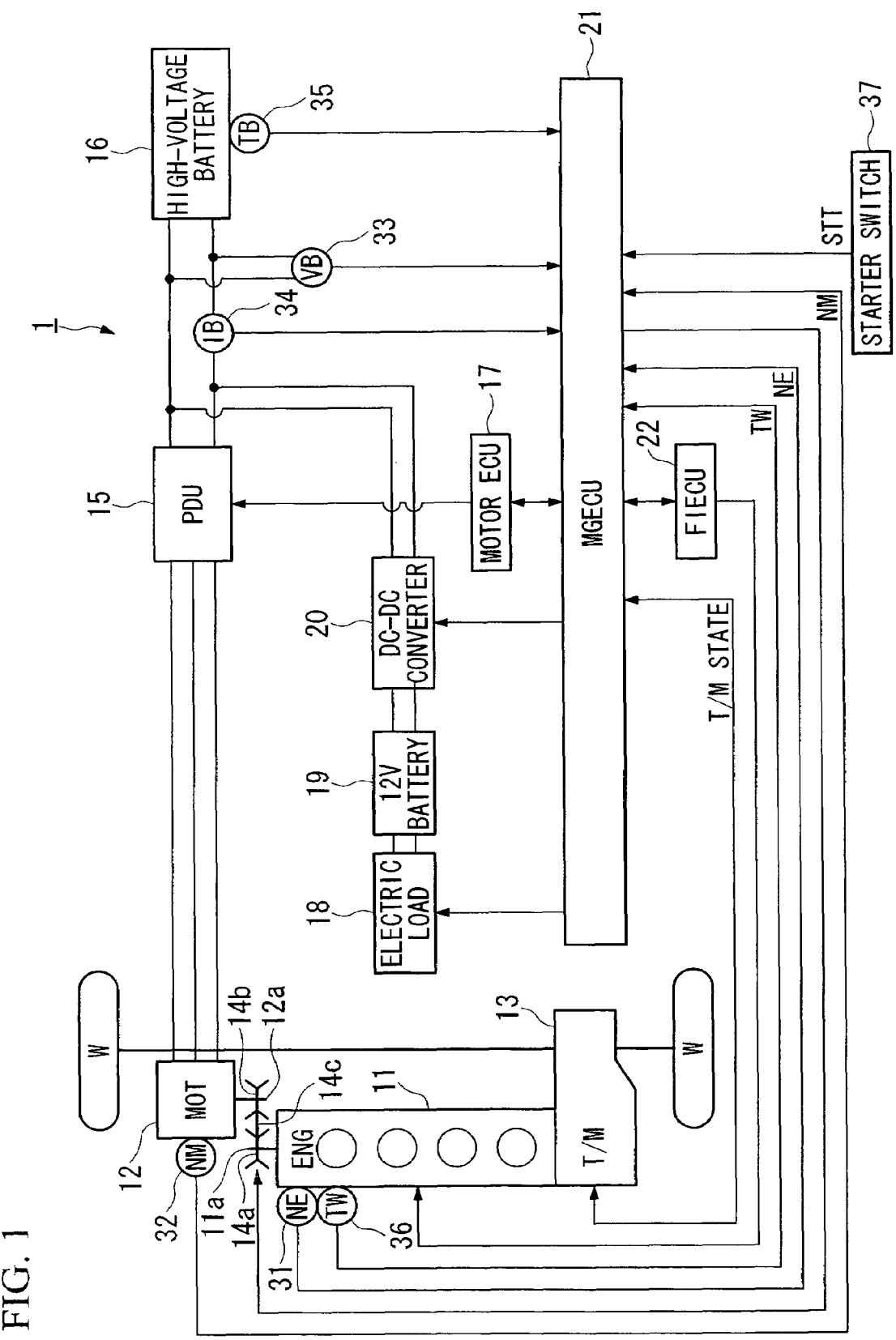
FIG. 1 is a block diagram showing the structure of the internal combustion engine starting control system for vehicles, as an embodiment according to the present invention.

FIG. 1 is a block diagram showing the structure of the internal combustion engine starting control system for vehicles, as an embodiment according to the present invention.

As shown in FIG. 1, the vehicle 1, into which the internal combustion engine starting control system 10 is installed, includes an internal combustion engine (ENG) 11, a motor (MOT) 12 for staring the internal combustion engine 11 and assisting the output of the internal combustion engine 11, and a transmission (T/M) 13. The transmission 13 may be an automatic transmission (AT) or a manual transmission (MT), and the vehicle 1 also includes a differential gear (not shown) for distributing the driving force between the right and left driving wheels W at the front or rear of the vehicle. Both of the driving forces obtained by the internal combustion engine 11 and the motor 12 are transmitted via the transmission 13 and the differential gear to the driving wheels W. On the other hand, when driving force is transmitted from the driving wheels W to the motor 12 during deceleration of the vehicle, the motor functions as a generator for generating a regenerative braking force, so that the kinetic energy of the vehicle body is converted into and stored as electrical energy. In addition, according to the driving state of the vehicle 1, the motor 12 is driven as a generator by applying the output of the internal combustion engine 11, thereby generating electrical energy.

Reference numeral 14a indicates a crank shaft pulley integrally coupled with a crank shaft 11a, and reference numeral 14b indicates a drive shaft pulley integrally coupled with a rotation shaft 12a of the motor 12, where the crank shaft pulley 14a and the drive shaft pulley 14b form a pair of pulleys, and a belt 14c is stretched between the crank shaft pulley 14a and the drive shaft pulley 14b. The driving force is transmitted between the internal combustion engine 11 and the motor 12 via the belt 14c.

The pulley ratio between the crank shaft pulley 14a and the drive shaft pulley 14b can be changed to a suitable value by the control of an electronic control unit called an MGECU 21 (explained later).

The motor 12 may be a DC brushless motor having three phases (U, V, and W) which is connected to a power drive unit (PDU) 15. The power drive unit 15 has a PWM inverter which employs pulse width modulation (PWM). The PWM inverter includes a bridge circuit in which transistors as switching devices are connected in a bridge form.

To the power drive unit 15, a high-voltage battery 16 is connected, which sends and receives electric power to and from the motor 12. Typically, the electric power is (i) power supplied to the motor 12 when the motor 12 is driven or operated so as to assist the engine, or (ii) power output from the motor 12 during regenerative operation.

The power drive unit 15 receives control commands from a motor ECU (electronic control unit) 17 and controls driving and regenerative operation of the motor 12. For example, when the motor 12 is driven, the power drive unit 15 converts DC power, output from the high-voltage battery 16, to three-phase AC power, based on a control command output from the motor ECU 17, and the converted power is supplied to the motor 12. When the motor 12 operates for regeneration, the three-phase power output from the motor 12 is converted by the power drive unit 15 to DC power, so as to charge the high-voltage battery 16.

The above power conversion operation of the power drive unit 15 is controlled by pulses (i.e., a pulse signal) input from the motor ECU 17 to each switching device in the PWM inverter, that is, by pulses (i.e., a pulse signal) for ON/OFF driving (i.e., setting the ON or OFF states of) each switching element in the PWM method. The duty ratio of the pulses, that is, a map (or data) for a ratio between ON and OFF states, is stored in advance in the motor ECU 17.

Reference numeral 19 indicates a 12V battery for driving an electric load 18 which includes various accessories (or auxiliary devices). The 12V battery 19 is connected to the power drive unit 15 and the high-voltage battery 16 in parallel via a DC-DC converter 20. The DC-DC converter 20, whose electric power conversion is controlled by the MGECU 21, may be a bidirectional DC-DC converter for reducing the terminal voltage of the high-voltage battery 16 (i.e., a battery voltage VB) or the terminal voltage of the power drive unit 15 when regenerative operation of the motor 12 is performed or the voltage of the motor 12 is increased. That is, the terminal voltage is reduced to a specific voltage, so as to charge the 12V battery 19. In addition, when the remaining amount of charge (i.e., SOC (state of charge)) of the high-voltage battery 16 is small, the terminal voltage of the 12V battery 19 can be increased by the DC-DC converter 20 so as to charge the high-voltage battery 16.

The MGECU 21 controls (i) the operation of an FIECU 22 which is provided for controlling the driving state of the internal combustion engine 11, (ii) electric conversion operations of the power drive unit 15 and the DC-DC converter 20, (iii) the operation state of the electric load 18, and the like.

Therefore, the MGECU 21 receives signals from various sensors, that is, (i) sensors for detecting the states of the internal combustion engine 11 and the motor 12, for example, an engine speed sensor 31 for measuring the rotation speed of the internal combustion engine 11 (i.e., the engine (rotation) speed NE) and a motor speed sensor 32 for measuring the rotation speed of the motor 12 (i.e., the motor (rotation) speed NM) based on the position of the magnetic poles (corresponding to the phase angle) of the rotor of the motor 12, (ii) a battery voltage sensor 33 for measuring the charged voltage of the high-voltage battery 16 (i.e., the battery voltage VB), (iii) a battery current sensor 34 for measuring the discharging or charging current of the high-voltage battery 16 (i.e., the battery current IB), (iv) a battery temperature sensor 34 for measuring the temperature of the high-voltage battery 16 (i.e., the battery temperature TB), and (v) a temperature sensor 36 for measuring the temperature of the cooling water for the internal combustion engine 11 (i.e., the engine water temperature TW).

According to the driving state of the vehicle 1, the MGECU 21 automatically executes stopping and restarting operations of the internal combustion engine 11 via the FIECU 11. For example, in the idling state of the internal combustion engine 11, an idle stop operation for prohibiting unnecessary idling drive operation is automatically executed according to the vehicle's condition, so as to reduce fuel consumption.

In addition, when the vehicle 1 is started, or restarted from the idle stop state, the internal combustion engine 11 in the stopped state can be started by using the driving force of the motor 12. In this process, the MGECU 21 performs feedback control of the rotation speed NM (output from the motor speed sensor 32) of the motor 12. For example, the MGECU 21 computes a target rotation speed NMC of the motor 12 based on the driving state (and the like) of the vehicle 1 and performs a control for making a rotation speed difference eN (=NM−NMC) approach zero. Here, the MGECU 21 executes control of a type called response designation feedback control for appropriately designating response conditions when the rotation speed difference eN is made to converge to zero.

Figure 2:
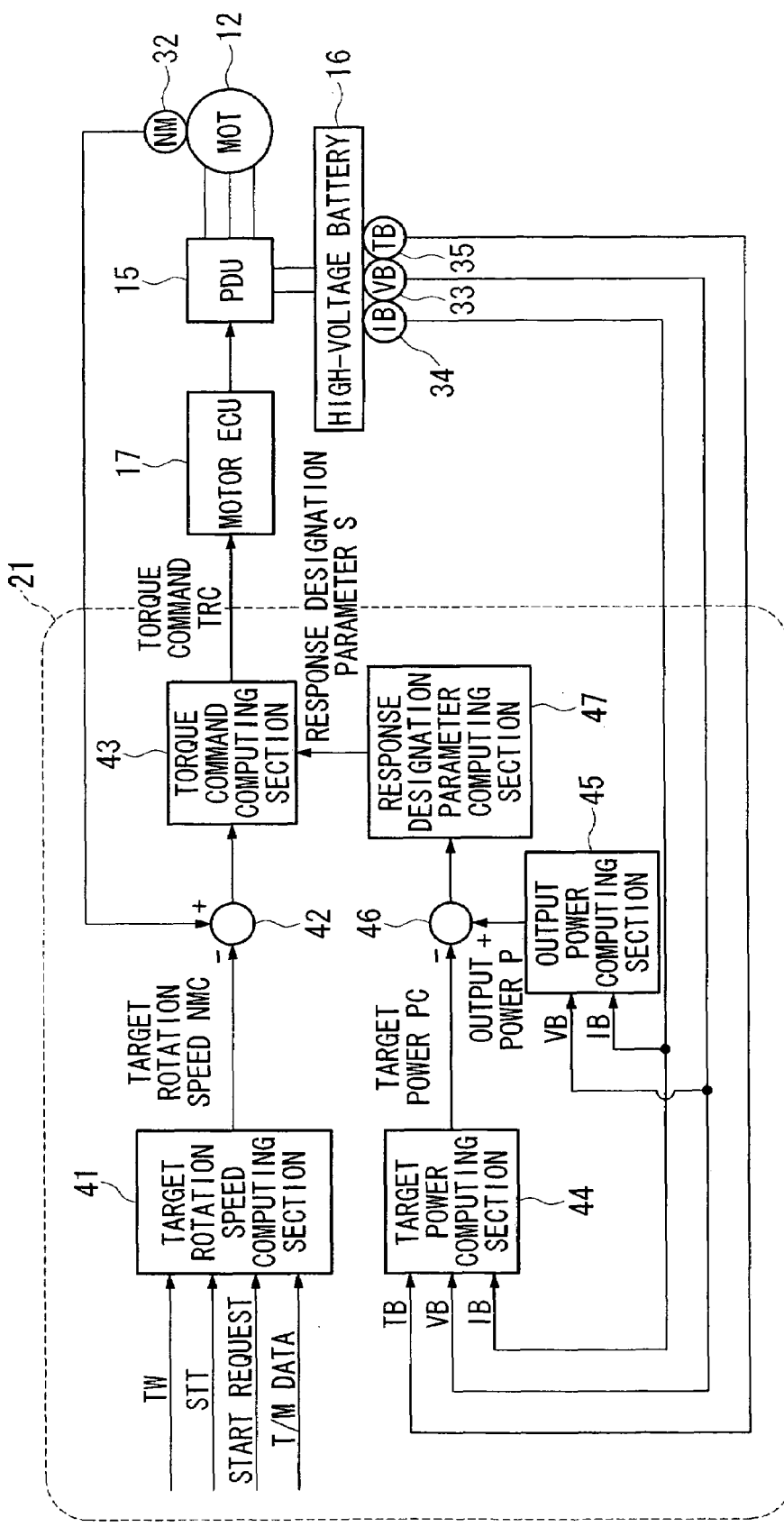
FIG. 2 is a block diagram showing the structure of the MGECU in FIG. 1.

FIG. 2 is a block diagram showing the structure of the MGECU in FIG. 1. As shown in FIG. 2, the MGECU 21 has a target rotation speed computing section 41, a rotation speed subtracting section 42, a torque command computing section 43, a target power computing section 44, an output power computing section 45, a power subtracting section 46, and a response designation parameter computing section 47.

The target rotation speed computing section 41 computes a target rotation speed NMC(k) of the motor 12, typically based on (i) the engine water temperature TW, (ii) a signal STT indicating the ON/OFF state of a starter switch 37 for starting the internal combustion engine 11 (i.e., a starter SW), where the ON/OFF state is determined by the driver's operation, (iii) presence or absence of a start request signal for commanding restart from the idle stop state, and (iv) a signal indicating the state of the transmission 13 (e.g., data of the transmission including the shift position or the gear ratio corresponding to the shift position). The target rotation speed NMC(k) is output to the rotation speed subtracting section 42.

The rotation speed subtracting section 42 computes a rotation speed difference eN(k), typically by subtracting the target rotation speed NMC(k) from the motor rotation speed NM(k) which is output from the motor speed sensor 32 (see formula (1)), and outputs the computed rotation speed difference eN(k) to the torque command computing section 43. Here, "k" is a natural number which indicates the number of execution steps which are executed in a series of processes (explained later).

$$eN(k)=NM(k)-NMC(k) \quad (1)$$

In accordance with a response designation parameter S output from the response designation parameter computing section 47 (explained later), the torque command computing section 43 defines a switching function σN(k) which may be indicated by the following formula (2).

$$\sigma N(k)=eN(k)-S \times eN(k-1) \quad (2)$$

In the above formula (2), the response designation parameter S (−1<S<1) is a parameter for defining the switching function σN(k) which determines the convergence operation of the rotation speed difference eN(k) indicated by the above formula (1). In particular, the switching function σN(k) determines the convergence speed of the rotation speed difference eN(k).

If σN(k)=0 in formula (2), the following formula (3) can be obtained, which describes an equivalent input system, that is, a stable system having no external input.

$$eN(k)=S \times eN(k-1) \quad (3)$$

Figure 3:
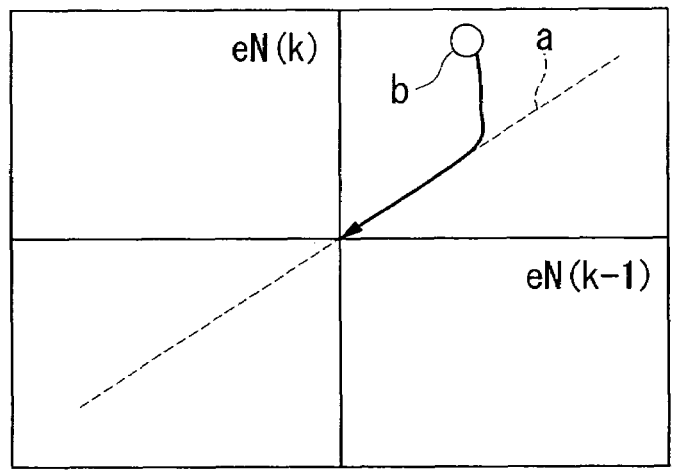
FIG. 3 is a diagram showing an initial value of a state quantity (eN(k−1), eN(k)) defined in a two-dimensional phase plane which has orthogonal axes of eN(k−1) and eN(k), and a switching straight line defined in the plane.

FIG. 3 is a diagram showing an initial value of a state quantity (eN(k−1), eN(k)) defined in a two-dimensional phase plane which has orthogonal axes of eN(k−1) and eN(k), and a switching straight line defined in the plane. That is, in FIG. 3, the rotation speed difference eN(k−1) when the number of execution steps is k−1, and the rotation speed difference eN(k) when the number of execution steps is k, are defined as orthogonal axes in a two-dimensional phase plane. In this plane, a specific straight line called the switching straight line (e.g., a dashed line a in FIG. 3) can be described by the above formula (3), and the gradient or slope of this straight line is determined by the response designation parameter S.

The state quantity is defined by eN(k−1) and eN(k) and has an initial value obtained by providing appropriate values to eN(k−1) and eN(k) (e.g., a value corresponding to a coordinate position b in FIG. 3). The response designation control is performed for restricting the state quantity onto the switching straight line (e.g., the dashed line a in FIG. 3), so as to stably bring the state quantity to the origin 0 in the phase plane without being affected by external disturbance or the like. Accordingly, even if the system has an error due to external disturbance or a modeling error, the motor rotation speed NM can be brought to the target rotation speed NMC by robust control.

Figure 4:
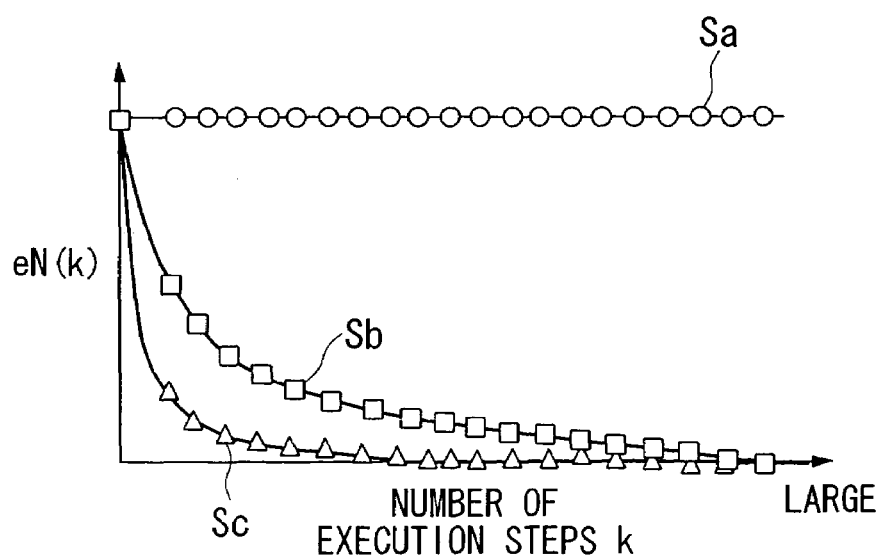
FIG. 4 is a graph showing variations in the convergence characteristics, in accordance with the value of the response designation parameter S.

The response designation parameter S, by which the convergence speed of the rotation speed difference eN(k) is determined, can be set to an appropriate value. With a smaller absolute value of the response designation parameter S, the convergence speed is higher. FIG. 4 is a graph showing variations in the convergence characteristics, in accordance with the value of the response designation parameter S. In the Figure, reference symbol Sa indicates a convergence characteristic when S=−1. According to this convergence characteristic, the rotation speed difference eN(k) does not converge even when the number of execution steps k increases. Additionally, in FIG. 4, reference symbol Sb indicates a convergence characteristic when S=−0.8, and reference symbol Sc indicates a convergence characteristic when S=−0.5, that is, when the absolute value of S is relatively small in comparison with Sb. In the convergence characteristic Sc, the rotation speed difference eN(k) converges to zero when the number of execution steps k is smaller.

Therefore, the torque command computing section 43 executes feedback control for the motor rotation speed NM(k), by using a torque command value TRC(k) as a manipulated variable in the feedback control (see the following formula (4)), so as to bring the switching function σN(k) to zero, thereby converging or bringing the motor rotation speed NM(k) to the target rotation speed NMC(k).

$$TRC(k) = TRCFF - Kr \times \sigma N(k) - Ka \times \sum_{i=0}^{k} \sigma N(i) \quad (4)$$

In formula (4), a torque command reference value TRCFF may be a value retrieved by searching a specific map, or a value computed by an arithmetic expression based on a specific model. This torque command reference value TRCFF is an equivalent control input term for restricting the state quantity (eN(k−1), eN(k)) onto the switching straight line. A proportional term in which the switching function σN(k) is multiplied by a specific feedback gain Kr, that is, the second term in formula (4), is an approach rule input term for restricting the state quantity (eN(k−1), eN(k)) onto the switching straight line. An integration term with respect to the switching function σN(i), the term employing a specific feedback gain Ka, that is, the third term in the formula (4), is an adaptive rule input term for restricting the state quantity (eN(k−1), eN(k)) onto the switching straight line while reducing errors due to external disturbance and modeling operation.

Typically, the target power computing section 44 computes a target (electric) power PC(k) which may be a permitted output power as an output limit of the high-voltage battery 16. This target power PC(k) may be computed based on the battery temperature TB output from the battery temperature sensor 34, the battery voltage VB output from the battery voltage sensor 33, and the battery current IB output from the battery current sensor 34. The computed target power PC(k) is output to the power subtracting section 46.

The output power computing section 45 computes the output power P(k) which is the actual output from the high-voltage battery 16, based on the battery voltage VB output from the battery voltage sensor 33 and the battery current IB output from the battery current sensor 34. The computed output power P(k) is output to the power subtracting section 46.

The power subtracting section 46 subtracts the target power PC(k), which is output from the target power computing section 44, from the output power P(k), which is output from the output power computing section 45, so as to compute the power difference eP(k), as shown by the following formula (5).

$$eP(k)=P(k)-PC(k) \tag{5}$$

The computed power difference eP(k) is output to the response designation parameter computing section 47. The response designation parameter computing section 47 employs an appropriate response designation parameter Sp so as to define the switching function σP(k) (see formula (6)).

$$\sigma P(k)=eP(k)-Sp \times eP(k-1) \tag{6}$$

The response designation parameter computing section 47 also executes response designation feedback control for the output power P(k), by using the response designation parameter S as a manipulated variable in the feedback control (see formula (7)). The computed response designation parameter S is output to the torque command computing section 43.

$$S(k) = SFF - Krch \times \sigma P(k) - Kadp \times \sum_{i=0}^{k} \sigma P(i) \tag{7}$$

In the above formula (7), the response designation parameter reference value SFF may be a value retrieved by searching a specific map, or a value computed by an arithmetic expression based on a specific model. The feedback gains Krch and Kadp are predetermined values.

The internal combustion engine starting control system 10 in the present embodiment has the above-explained structure, and the operation of the internal combustion engine starting control system 10 will be explained below.

Figure 5:
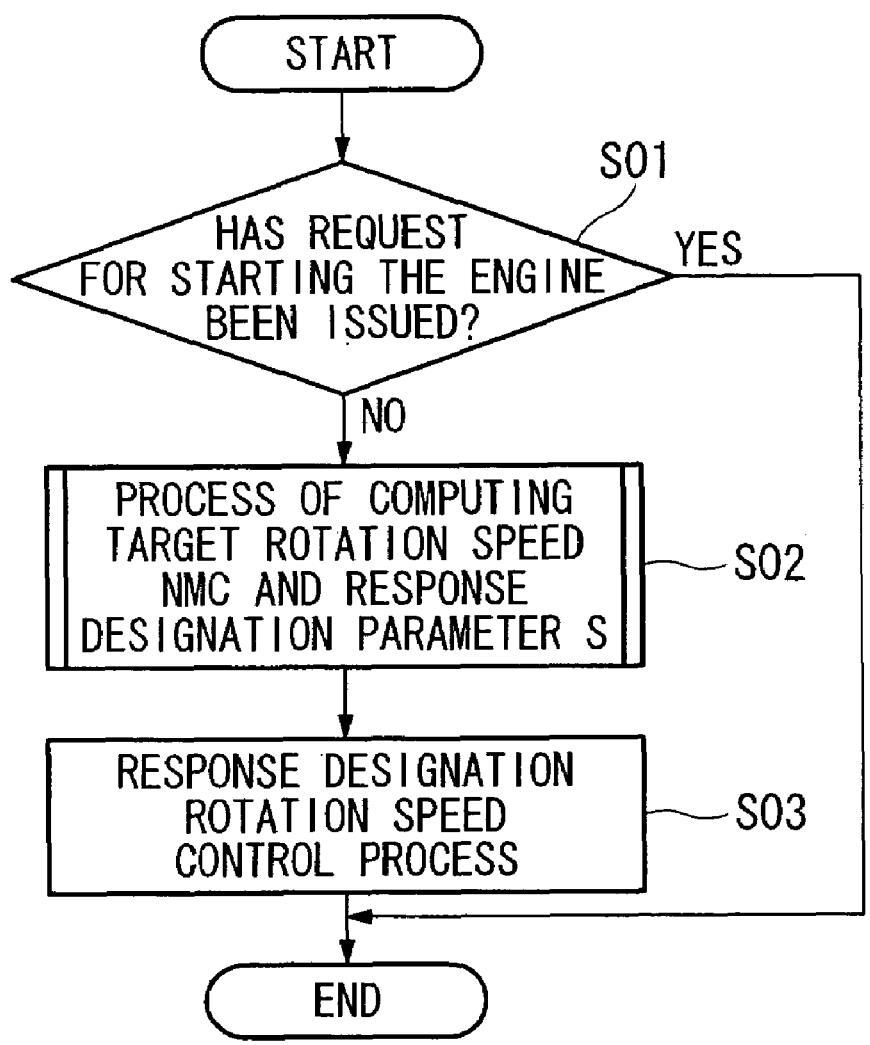
FIG. 5 is a flowchart showing the operation of the internal combustion engine starting control system in FIG. 1.

FIG. 5 is a flowchart showing the operation of the internal combustion engine starting control system 10. As shown in the figure, in the first step S01, when the vehicle 1 is to be started or restarted from the idle stop state, it is determined whether a request for starting the internal combustion engine 11 has been issued. If the result of the determination is "NO", the operation of this flow is terminated. Conversely, when the result of the determination is "YES", the operation proceeds to step S02.

In step S02, a process of computing the target rotation speed NMC and the response designation parameter S is executed (the process will be explained later).

In the next step S03, a response designation rotation speed control process is performed, in which based on the computed target rotation speed NMC and response designation parameter S, the response designation feedback control for the motor rotation speed NM(k) is executed by using the torque command value TRC(k) as the manipulated variable, so as to bring the switching function σN(k) to zero and to bring the motor rotation speed NM(k) to the target rotation speed NMC(k). In this process, a control command for making the motor 12 output a torque corresponding to the torque command value TRC is output. In a specific example, pulses (i.e., pulse signals) for controlling the ON/OFF states of each switching element of the power drive unit 15 in the pulse width modulation (PWM) are output as the control command. The operation of the present flow is then completed.

Figure 6:
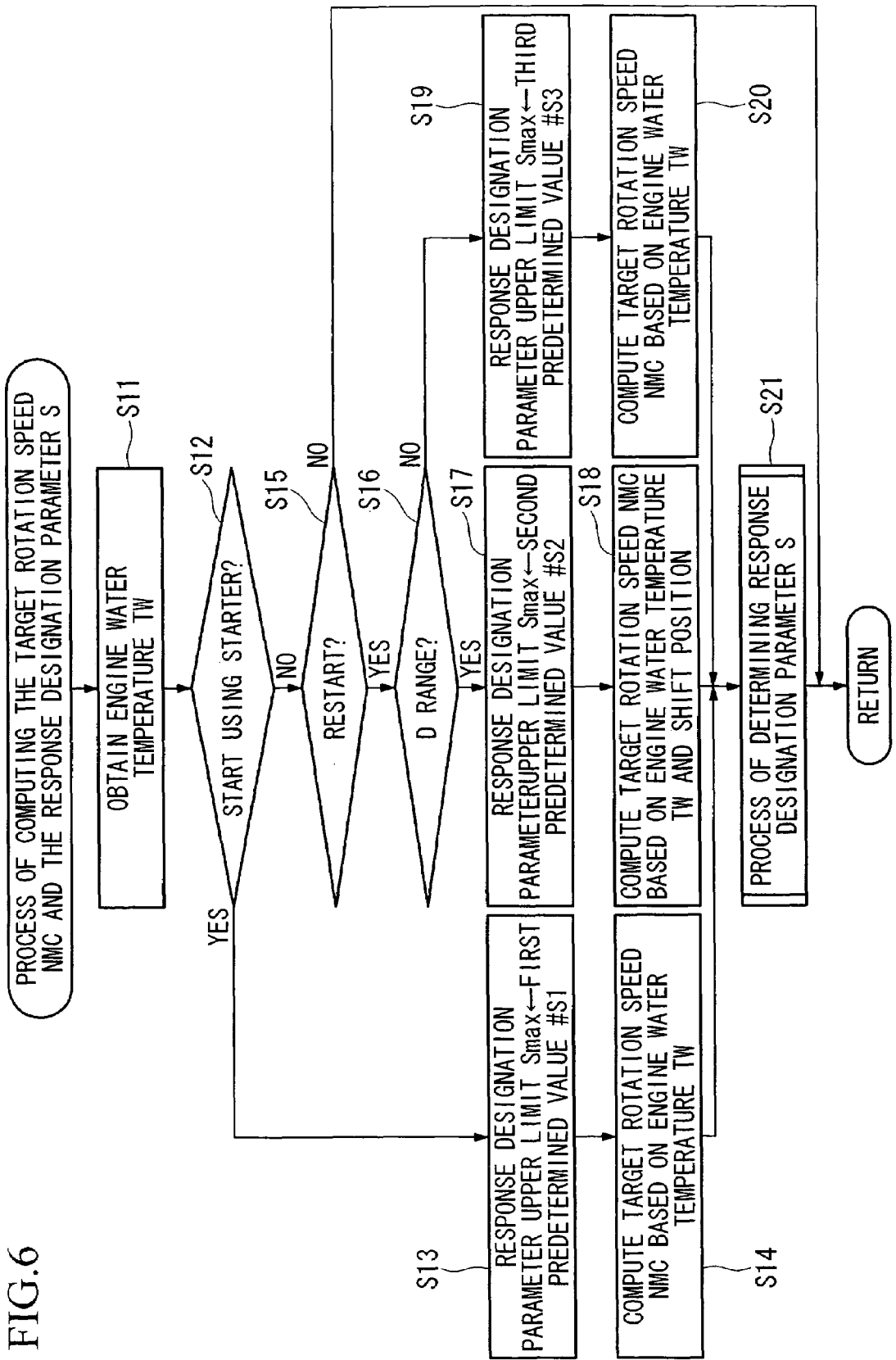
FIG. 6 is a flowchart showing the process of computing the target rotation speed NMC and the response designation parameter S of step S02 in FIG. 5.

Below, the process of computing the target rotation speed NMC and the response designation parameter S in the above-described step S02 will be explained. FIG. 6 is a flowchart showing this process.

In the first step S11 in FIG. 6, a measured value of the engine water temperature TW is obtained. In the next step S12, it is determined whether the vehicle 1 has been started by the starter, that is, whether the starter switch 37 has been switched from OFF to ON. If the result of the determination is "NO", that is, typically, when the vehicle 1 is restarted from the idle stop state, the operation proceeds to step S15 (explained later).

If the result of the determination in step S11 is "YES", the operation proceeds to step S13 in which the upper limit Smax for the response designation parameter S is set to the first predetermined value #S1 (e.g., −0.4).

In the next step S14, based on the obtained engine water temperature TW, the target rotation speed NMC is computed, and the operation proceeds to step S21 (explained later). In a typical example of step S14, the target rotation speed NMC is retrieved from a predetermined map (stored in advance) by using the engine water temperature TW. In this map, data are defined in a manner such that the target rotation speed NMC decreases in accordance with increase in the engine water temperature TW.

In step S15, it is determined whether the vehicle 1 is restarted from the idle stop state. If the result of the determination is "NO", the operation of this flow is terminated. Conversely, when the result of the determination is "YES", the operation proceeds to step S16.

In step S16, it is determined whether the shift position of the transmission 13 is in the D (drive) range. If the result of the determination is "NO", the operation proceeds to step S19 explained later. Conversely, when the result of the determination is "YES", the operation proceeds to step S17, in which the upper limit Smax of the response designation parameter S is set to the second predetermined value #S2 (e.g., −0.6).

In step S18, the target rotation speed NMC is computed based on the obtained engine water temperature TW and the shift position of the transmission 13, and the operation proceeds to step S21, explained later. In this step S18, typically, the target rotation speed NMC is retrieved from a predetermined map (stored in advance) by using the engine water temperature TW and the shift position. In the map, a predetermined relationship between the engine water temperature TW and the target rotation speed NMC is defined for each shift position. More specifically, for the same engine water temperature TW, the target rotation speed NMC increases in accordance with increase in the gear ratio which corresponds to the shift position, and for the same shift position, the target rotation speed NMC decreases in accordance with increase in the engine water temperature TW.

In step S19, the upper limit Smax of the response designation parameter S is set to the third predetermined value #S3 (e.g., −0.8).

In the following step S20, the target rotation speed NMC is computed based on the obtained engine water temperature TW, and the operation proceeds to step S21. In step S21, a process of determining the response designation parameter S (explained below) is executed, and the operation in the present flow is completed.

Figure 7:
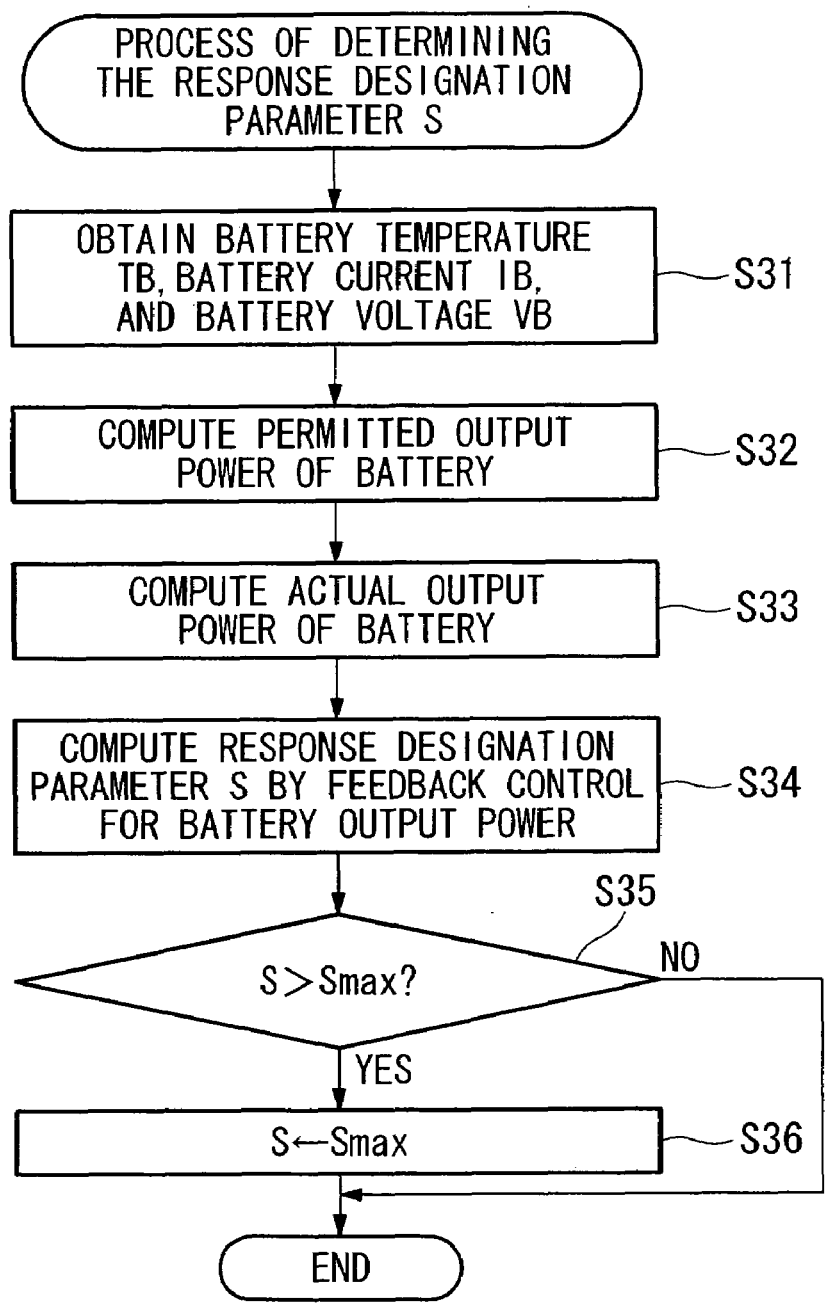
FIG. 7 is a flowchart showing the process of determining the response designation parameter S of step S21 in FIG. 6.

The process of determining the response designation parameter S in step S21 will be explained below. FIG. 7 is a flowchart showing this process. In the first step S31 in the figure, measured values of the battery temperature TB, the battery current IB, and the battery voltage VB of the high-voltage battery 16 are obtained. In the following step S32, based on the battery temperature TB, the battery current IB, and the battery voltage VB, a permitted output power is computed, which is an output limit of the high-voltage battery 16. In this step S32, typically, the permitted output power is retrieved from a predetermined map (stored in advance) by using the battery temperature TB, the battery current IB, and the battery voltage VB, where in the map, data are defined, for example, in a manner such that the permitted output power increases in accordance with increase in the battery temperature TB.

In the next step S33, based on the battery voltage VB and the battery current IB, the output power P(k) is computed, which is an actual output from the high-voltage battery 16.

In the following step S34, as shown by the above formula (7), the response designation feedback control for the output power P(k) is executed by using the response designation parameter S as the manipulated variable in the feedback control, thereby computing the response designation parameter S.

In the next step S35, it is determined whether the computed response designation parameter S is larger than the predetermined upper limit Smax for the response designation parameter S. If the result of the determination is "NO", the operation of this flow is terminated. Conversely, when the result of the determination is "YES", the operation proceeds to step S36, where the response designation parameter S is set to the predetermined upper limit Smax, and the operation of the present flow is completed.

In the above-explained response designation control, the convergence speed of the rotation speed difference eN(k) can be appropriately determined according to the response designation parameter S.

More specifically, when the vehicle is restarted, that is, when the actual output from the high-voltage battery 16 is larger than the target output, speed of response in the feedback control is reduced by increasing the absolute value of the response designation parameter S, so as to slowly increase the engine rotation speed. Conversely, when the vehicle is started using the starter, that is, when the actual output from the high-voltage battery 16 is smaller than the target output, speed of response in the feedback control is increased by decreasing the absolute value of the response designation parameter S, so as to quickly start the engine.

Figure 8A:
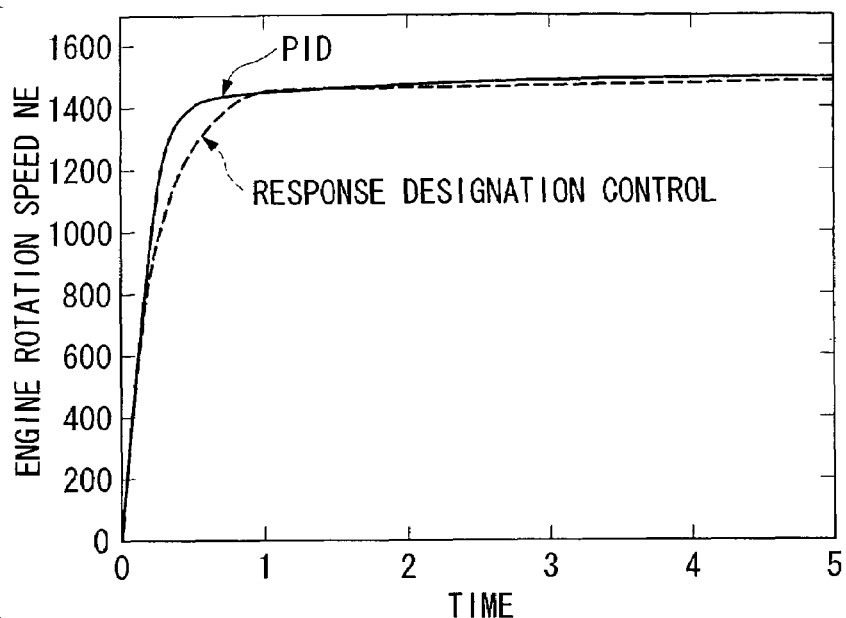
Figure 8B:
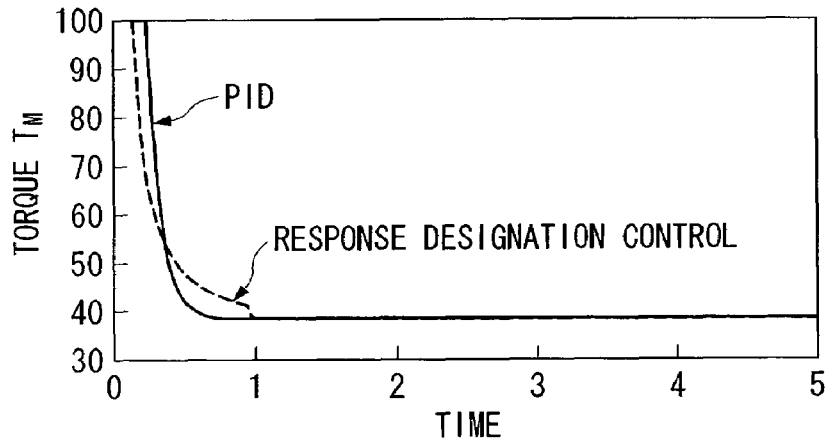
Figure 8C:
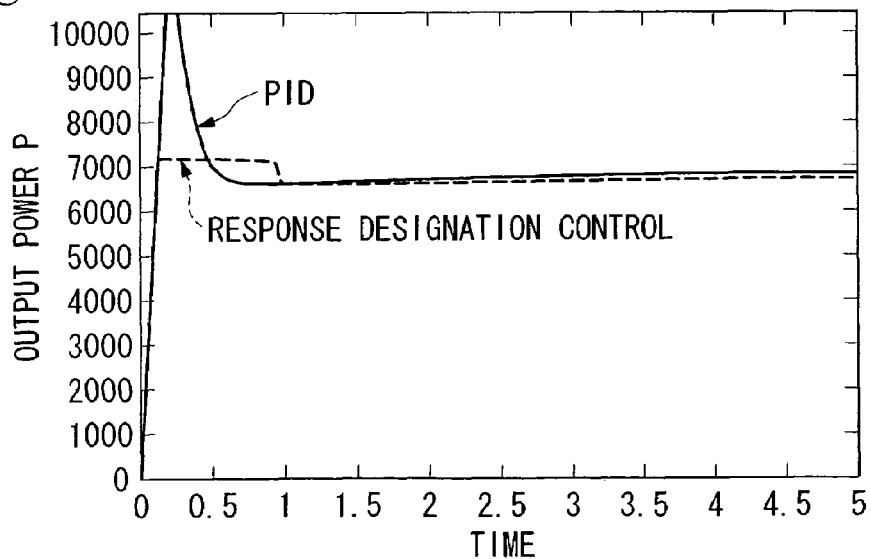

FIGS. 8A to 8C are graphs showing comparisons between the response designation control in the present embodiment (see dashed lines) and a comparative feedback control example using a simple PID (proportional, integral, and differential) operation (see solid lines). FIG. 8A shows temporal variations in the engine rotation speed NE, FIG. 8B shows temporal variations in the motor torque $T_M$, and FIG. 8C shows temporal variations in the output power P of the high-voltage battery 16.

As shown in FIG. 8A, in comparison with the simple feedback using the PID control, the response designation control of the present embodiment can prevent excessive temporal variation in the engine rotation speed NE.

When the internal combustion engine 11 is driven using the driving force obtained from the motor 12, the motor torque $T_M$ output from the motor 12 can be defined by the following formula (8) which employs the moment of inertia $I_E$ and the angular velocity $\omega$, that is, as the sum of the frictional resistance $F_E$ of the internal combustion engine 12 (i.e., the engine friction) and the inertia torque $I_E \times (d\omega/dt)$.

$$T_M = F_E + I_E d\omega/dt \quad (8)$$

That is, the inertia torque $I_E \times (d\omega/dt)$ of the motor torque $T_M$ can be changed by changing the convergence speed of the rotation speed difference eN(k) in accordance with the response designation parameter S. Accordingly, as shown in FIG. 8B, in comparison with the simple feedback using the PID control, the response designation control of the present embodiment can prevent excessive temporal variation in the motor torque $T_M$.

Additionally, in the response designation control of the present embodiment, the response designation parameter S is determined by the feedback control for the output power P of the high-voltage battery 16. Therefore, in comparison with the simple feedback using the PID control, when the motor rotation speed NM(k) is brought to the target rotation speed NMC(k), the response designation control of the present embodiment can prevent the output power P of the high-voltage battery 16 from excessively increasing and exceeding the permitted output power as the output limit (see FIG. 8C).

As explained above, according to the internal combustion engine starting control system 10 of the present invention, the convergence speed of the rotation speed difference eN(k) can be changed via the response designation parameter S, in accordance with the starting state of the internal combustion engine 11. Therefore, in comparison with a simple feedback using the PID (proportional, integral, and differential) control for the rotation speeds of the internal combustion engine 11 and the motor 12, it is possible to perform more appropriate starting control while appropriately considering the driver's intention for the starting of the vehicle.

Additionally, in order to determine the response designation parameter S, the response designation feedback control for the output of the high-voltage battery is executed by using this parameter S as the manipulated variable in the feedback control. Therefore, it is possible to prevent the output power P of the high-voltage battery 16 from excessively increasing and exceeding the permitted output power (i.e., the output limit). Accordingly, it is possible to prevent (i) degradation of the high-voltage battery 16 due to an excessive output from the battery 16, and (ii) difficulty in normal operation of other electrical equipment devices to which power is supplied from the high-voltage battery 16. Therefore, the output of the high-voltage battery 16 can be optimized for various kinds of starting requests and driving states, and the internal combustion engine 11 can be quickly and appropriately started.

In the above-explained embodiment, as shown in steps S31 to S34, the response designation parameter S is computed by executing the response designation feedback control for the output of the high-voltage battery, while using the response designation parameter S as the manipulated variable. However, this is not a limiting condition. For example, the response designation parameter S may be computed by executing the response designation feedback control for the output of the power drive unit 15. In this case, the MGECU 21 may compute the output power of the power drive unit 15 based on the outputs from the sensors for measuring the electric current and the applied voltage which are supplied from the power drive unit 15 to the motor 12, and perform the response designation feedback control by using the response designation parameter S as the manipulated variable, so as to make the difference between the actual output power and the target output power of the power drive unit 15 approach zero, where the target output power is a permitted output power as the output limit of the power drive unit 15.

Figure 9:
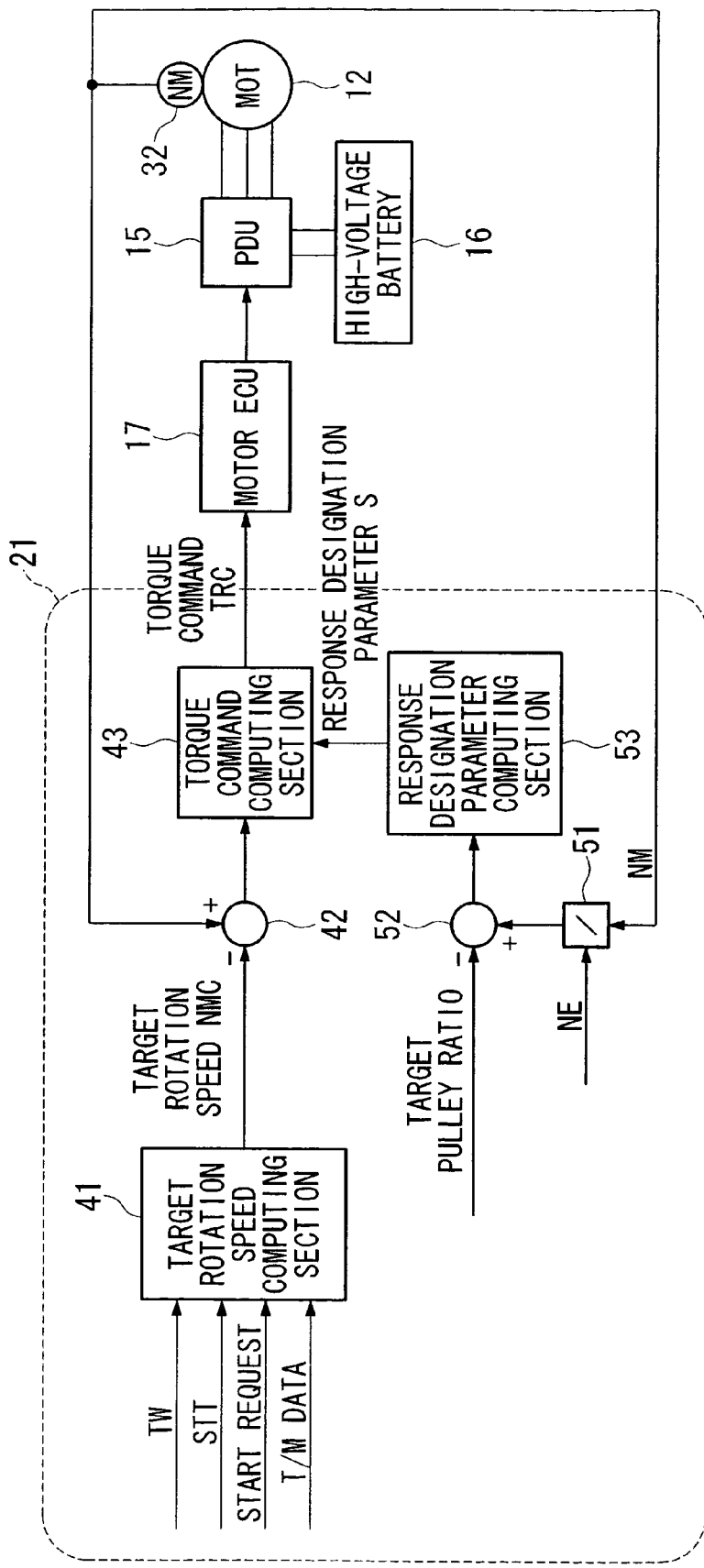
FIG. 9 is a block diagram for showing the structure of the MGECU 21 in a variation of the embodiment.

In another variation, the response designation feedback control for the rotation speed ratio between the engine speed NE and the motor speed NM may be executed by using the response designation parameter S as the manipulated variable, so as to compute the response designation parameter S. FIG. 9 is a block diagram for showing the structure of the MGECU 21 in this variation. As shown in the figure, the MGECU 21 has the target rotation speed computing section 41, the rotation speed subtracting section 42, the torque command computing section 43 (which are also shown in FIG. 2), a rotation speed ratio computing section 51, a ratio subtracting section 52, and a response designation parameter computing section 53.

The rotation speed ratio computing section 51 computes a ratio between the engine speed NE and the motor speed NM and outputs the computed ratio to the ratio subtracting section 52.

The ratio subtracting section 52 subtracts a target pulley ratio, which is a ratio between the crank shaft pulley 14a and the drive shaft pulley 14b and can be appropriately determined, from the rotation speed ratio output from the rotation speed ratio computing section 51, thereby computing the difference between the ratios. The ratio subtracting section 52 outputs the computed difference to the response designation parameter computing section 53. The response designation parameter computing section 53 executes response designation feedback control for the rotation speed ratio so as to compute the response designation parameter S which is the manipulated variable in this feedback control. The computed response designation parameter S is output to the torque command computing section 43.

Figure 10:
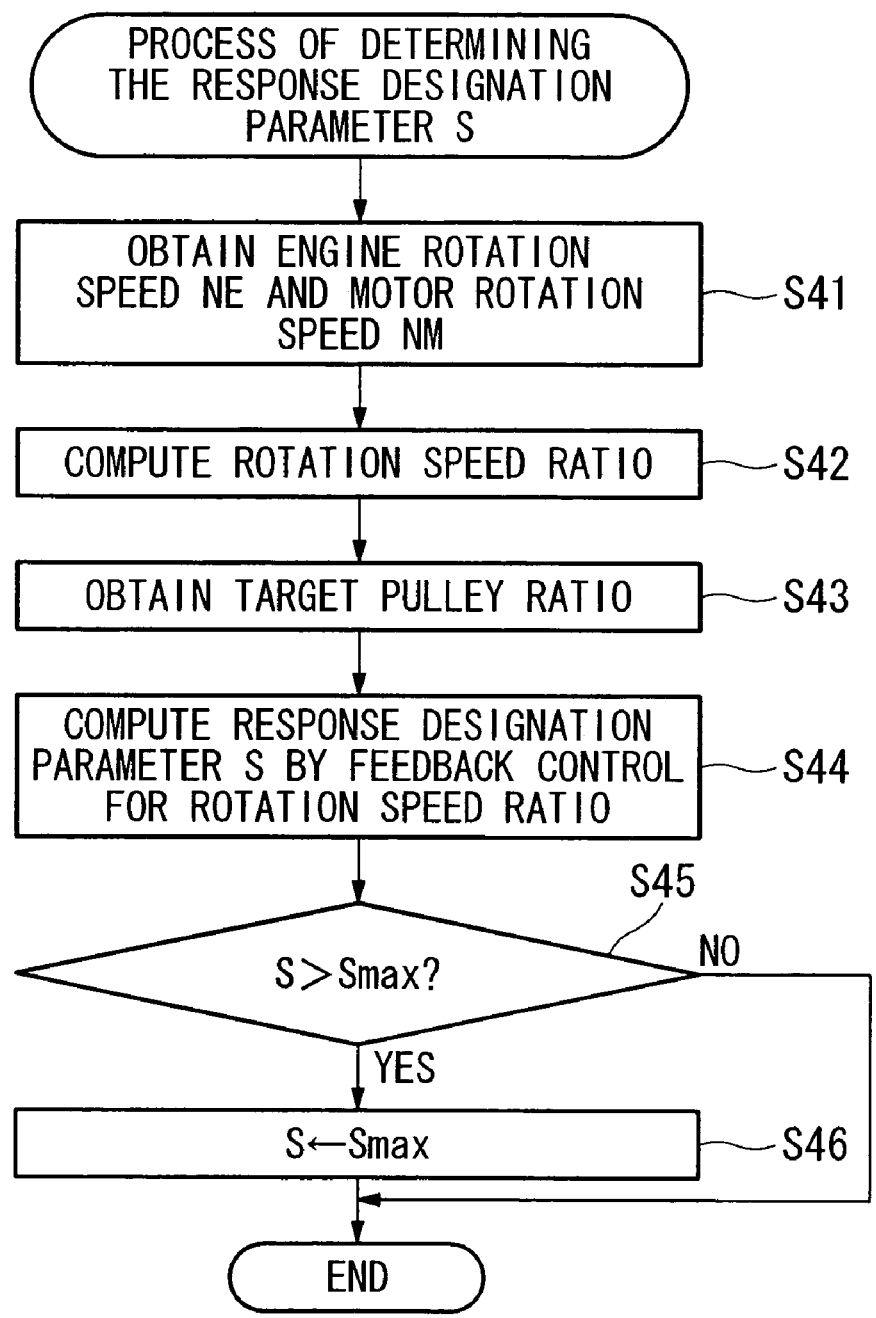
FIG. 10 is a flowchart showing the operation in the variation for determining the response designation parameter S.

FIG. 10 is a flowchart showing the operation in this variation for determining the response designation parameter S. In the figure, in the first step S41, measured values for the engine rotation speed NE and the motor rotation speed NM are obtained. In the next step S42, the rotation speed ratio between the engine rotation speed NE and the motor rotation speed NM is computed.

In step S43, a target pulley ratio is obtained. In the next step S44, the response designation feedback control for the rotation speed ratio is executed while computing the response designation parameter S which is the manipulated variable in this feedback control. That is, when there is a difference between the computed rotation ratio and the target pulley ratio, the belt 14c between the crank shaft pulley 14a and the drive shaft pulley 14b has a slip. In this case, speed of response in the response designation feedback control is reduced via the response designation parameter S.

In step S45, it is determined whether the response designation parameter S is larger than a predetermined upper limit Smax of the response designation parameter S. If the result of the determination is "NO", the operation of this flow is terminated. Conversely, when the result of the determination is "YES", the operation proceeds to step S46, where the response designation parameter S is set to the predetermined upper limit Smax, and the operation of the present flow is completed.

In this variation, it is possible to quickly start the internal combustion engine 11 while preventing a slip in the belt 14c between the crank shaft pulley 14a and the drive shaft pulley 14b. In the above step S44, instead of executing the response designation feedback control for the rotation speed ratio, map data retrieval by using the rotation speed ratio may be performed using a map stored in advance, so as to compute the response designation parameter S. In the map, data may be defined in a manner such that the response designation parameter S (<0) decreases (i.e., the absolute value thereof increases) in accordance with increase in the absolute value of the rotation speed difference obtained by subtracting the target pulley ratio from the rotation speed ratio.

Figure 11:
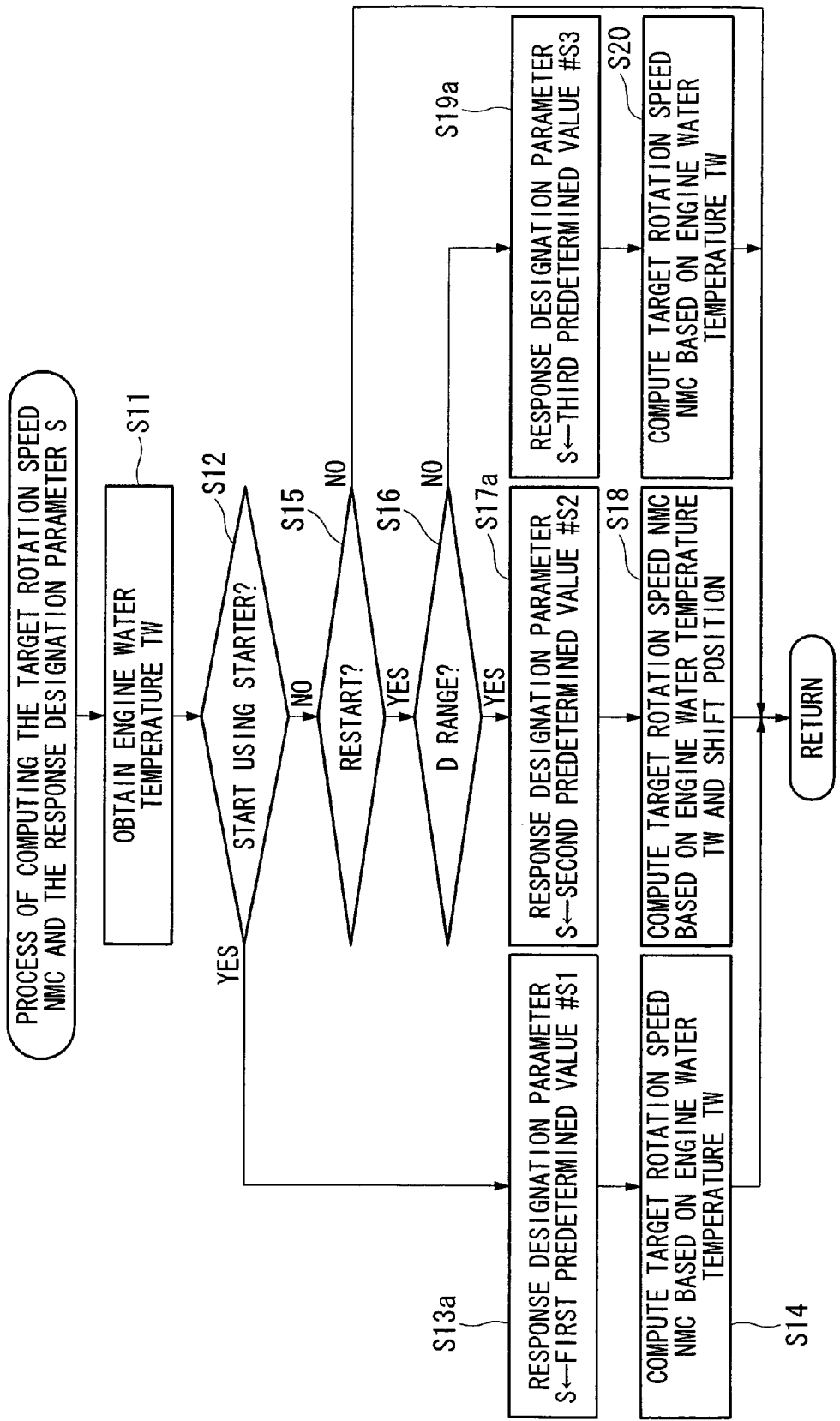
FIG. 11 is a flowchart showing the process of computing the target rotation speed NMC and the response designation parameter S in another variation of the embodiment.

Additionally, in the above embodiment, the upper limit Smax is set to the predetermined value #S1, #S2, or #S3 as shown in steps 13, 17, and 19. However, this is not a limiting condition. FIG. 11 is a flowchart showing the process of computing the target rotation speed NMC and the response designation parameter S in a variation of the present embodiment. As shown in steps 13a, 17a, and 19a in FIG. 11, the response designation parameter S may be set to the predetermined value #S1, #S2, or #S3. In this case, step S21 for determining the response designation parameter S is omitted.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An internal combustion engine starting control system for a vehicle which has an internal combustion engine as a driving source of the vehicle, the system comprising:
   a motor for driving the internal combustion engine; and
   a control device for performing driving control of the motor by making an actual rotation speed of the motor approach a predetermined target rotation speed, wherein:
   the driving control is a response designation feedback control based on a predetermined state quantity of the vehicle,
   the control device includes:
      a response designation parameter setting device for setting a response designation parameter based on a predetermined state of the vehicle, so as to determine a convergence speed when the actual rotation speed of the motor is made to converge to the predetermined target rotation speed;
      a switching function setting device for setting a switching function based on a response designation parameter and the difference between the actual rotation speed and the predetermined target rotation speed of the motor; and
   the control device computes a torque command so that the switching function set by the switching function setting device has a predetermined value.

2. The internal combustion engine starting control system as claimed in claim 1,
   wherein the control device changes a response condition in the response designation feedback control in accordance with one of possible starting states of the internal combustion engine, by using the response designation parameter, by which an approach condition in the operation for making the actual rotation speed of the motor approach the predetermined target rotation speed is changeable.

3. The internal combustion engine starting control system as claimed in claim 2, wherein the possible starting states include at least starting of the internal combustion engine when the vehicle is started, and restarting of the internal combustion engine from an idle stop state of the vehicle.

4. The internal combustion engine starting control system as claimed in claim 1, wherein:
the vehicle includes a motor control unit for controlling an operation state of the motor, and a battery device for sending and receiving electrical energy to and from the motor in accordance with control by the motor control unit;
the control device uses the response designation parameter as a manipulated variable in the feedback control; and
the control device determines the response designation parameter by making an actual output from one of the motor control unit and the battery device approach a target output which is predetermined in accordance with a predetermined state quantity of the vehicle, wherein the response designation parameter is determined in a manner such that when the actual output is larger than the target output, speed of response in the response designation feedback control is decreased, and when the actual output is smaller than the target output, the speed of response in the response designation feedback control is increased.

5. The internal combustion engine starting control system as claimed in claim 1, wherein:
a driving force from the motor is transmittable to the internal combustion engine via a driving force transmitting device; and
the control device detects a slip of the driving force transmitting device based on a rotation speed of a rotation shaft of the motor and a rotation speed of a crank shaft of the internal combustion engine, wherein when the slip is detected, speed response in the response designation feedback control is decreased by using the response designation parameter.

6. The internal combustion engine starting control system as claimed in claim 5, wherein:
the driving force transmitting device includes a belt; and
the slip is detected by computing a difference between a rotation speed ratio, which is a ratio between the rotation speed of the rotation shaft of the motor and the rotation speed of the crank shaft of the internal combustion engine, and a predetermined pulley ratio of the belt.

7. The internal combustion engine starting control system as claimed in claim 1, wherein the vehicle includes a motor control unit for controlling an operation state of the motor, and the response designation parameter is set through a feedback control for making a power output from the motor control unit approach a predetermined target output in accordance with a predetermined state of the vehicle.

8. The internal combustion engine starting control system as claimed in claim 7, wherein the target output is a permitted output power of the motor control unit.

9. The internal combustion engine starting control system as claimed in claim 1, wherein the response designation parameter is set based on at least one of a current, voltage, and temperature of a battery device in the vehicle.

10. The internal combustion engine starting control system as claimed in claim 1, wherein the response designation parameter is set through a feedback control for making a power output from a battery device of the vehicle approach a predetermined target output in accordance with a predetermined state of the vehicle.

11. The internal combustion engine starting control system as claimed in claim 10, wherein the target output is set based on at least one of a current, voltage, and temperature of the battery device.

12. The internal combustion engine starting control system as claimed in claim 1, wherein the vehicle includes a motor control unit for controlling an operation state of the motor, and the response designation parameter is set based on at least one of an electric current supplied to the motor from the motor control unit, a voltage applied to the motor by the motor control unit, and a permitted output power of the motor control unit.

13. The internal combustion engine starting control system as claimed in claim 1, wherein the response designation parameter is set based on at least one of a rotation speed of the engine, a rotation speed of the motor, a rotation speed ratio therebetween, and a target value of the rotation speed ratio.

14. The internal combustion engine starting control system as claimed in claim 13, wherein the response designation parameter is set through a feedback control for making the rotation speed ratio approach a predetermined target rotation speed ratio.

15. The internal combustion engine starting control system as claimed in claim 1, wherein the target rotation speed of the motor is set based on at least one of a water temperature of the engine and a state of a transmission of the vehicle.

16. The internal combustion engine starting control system as claimed in claim 1, wherein the response designation parameter is set smaller than a predetermined upper limit.

17. The internal combustion engine starting control system as claimed in claim 15, wherein the response designation parameter is set smaller than a predetermined upper limit.

18. An internal combustion engine starting control system for a vehicle which has an internal combustion engine as a driving source of the vehicle, the system comprising:
a motor for driving the internal combustion engine; and
a control device for performing driving control of the motor by making an actual rotation speed of the motor approach a predetermined target rotation speed, wherein the driving control is a response designation feedback control based on a predetermined state quantity of the vehicle, wherein
a driving force from the motor is transmittable to the internal combustion engine via a driving force transmitting device; and
the control device detects a slip of the driving force transmitting device based on a rotation speed of a rotation shaft of the motor and a rotation speed of a crank shaft of the internal combustion engine, wherein when the slip is detected, speed of response in the response designation feedback control is decreased by using a response designation parameter for designating a response condition in the response designation feedback control.

19. The internal combustion engine starting control system as claimed in claim 18, wherein:
the driving force transmitting device includes a belt; and
the slip is detected by computing a difference between a rotation speed ratio, which is a ratio between the rotation speed of the rotation shaft of the motor and the rotation speed of the crank shaft of the internal combustion engine, and a predetermined pulley ratio of the belt.

* * * * *